United States Patent
Maeda

(10) Patent No.: US 8,210,684 B2
(45) Date of Patent: Jul. 3, 2012

(54) ILLUMINATION APPARATUS AND PROJECTION DISPLAY APPARATUS

(75) Inventor: Makoto Maeda, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 519 days.

(21) Appl. No.: 12/537,431

(22) Filed: Aug. 7, 2009

(65) Prior Publication Data

US 2010/0033681 A1 Feb. 11, 2010

(30) Foreign Application Priority Data

Aug. 8, 2008 (JP) .................... 2008-206232

(51) Int. Cl.
*G03B 21/00* (2006.01)
*G03B 21/14* (2006.01)

(52) U.S. Cl. ........................... 353/20; 353/31

(58) Field of Classification Search ............... 353/20, 353/31, 94; 359/483.01
See application file for complete search history.

(56) References Cited

U.S. PATENT DOCUMENTS 6,644,812 B2 * 11/2003 Kodama et al. ............ 353/31
7,854,516 B2 * 12/2010 Maeda et al. .............. 353/31

FOREIGN PATENT DOCUMENTS

JP 2002-287247 A 10/2002

* cited by examiner

Primary Examiner — Tony Ko
(74) Attorney, Agent, or Firm — Marvin A. Motsenbocker; Mots Law, PLLC

(57) ABSTRACT

An illumination apparatus includes multiple liquid crystal panels, a polarization-state adjusting element, and a cross dichroic prism. A green component light includes a central-wavelength component light, a short-wavelength component light, and a long-wavelength component light. The polarization-state adjusting element separately adjusts a polarization state of the central-wavelength component light and each of polarization states of the long-wavelength component light and the short-wavelength component light.

6 Claims, 11 Drawing Sheets

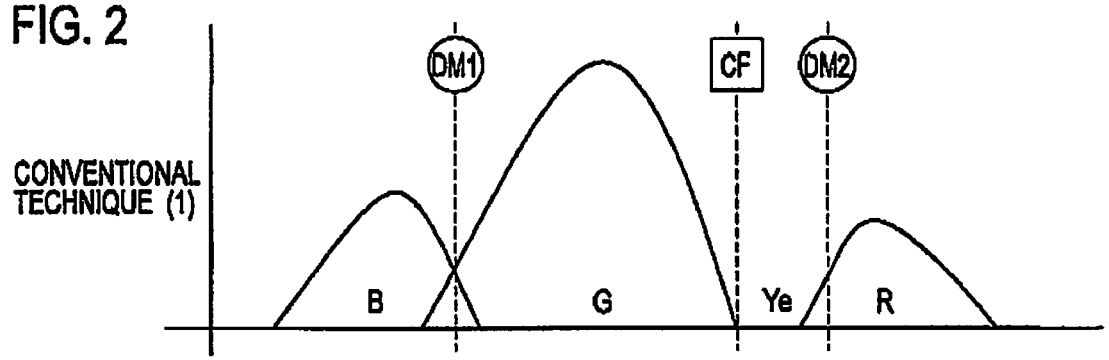
FIG. 2 CONVENTIONAL TECHNIQUE (1)
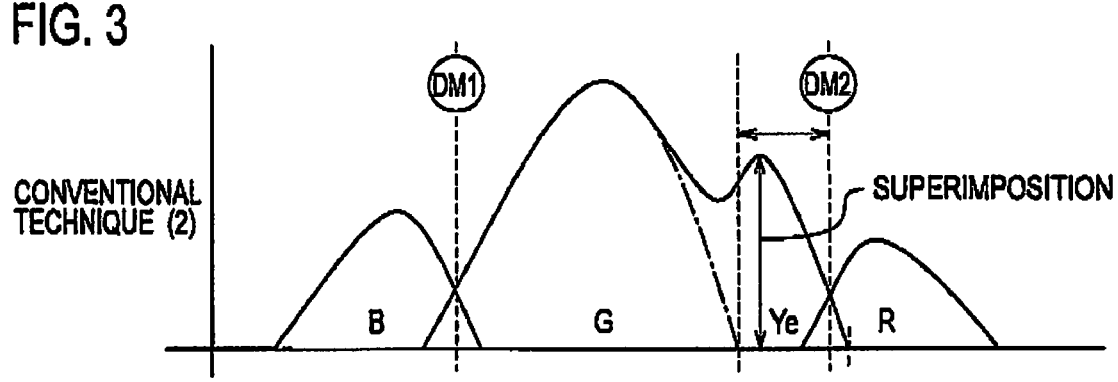
FIG. 3 CONVENTIONAL TECHNIQUE (2)
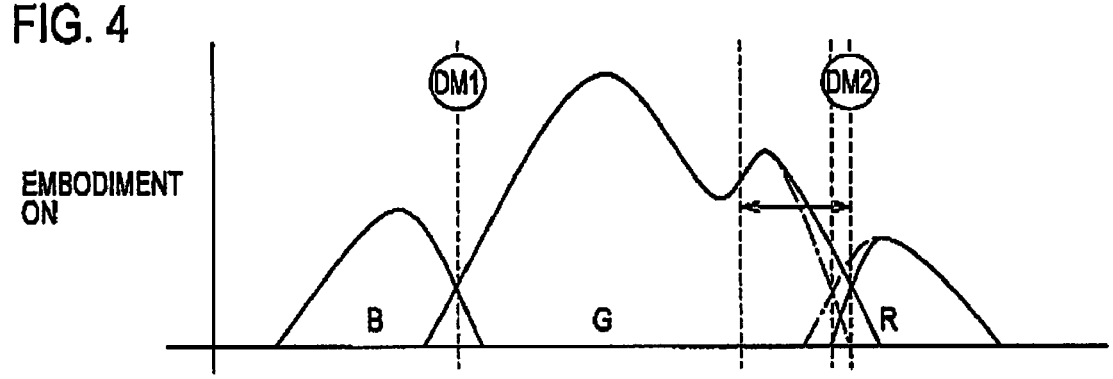
FIG. 4 EMBODIMENT ON
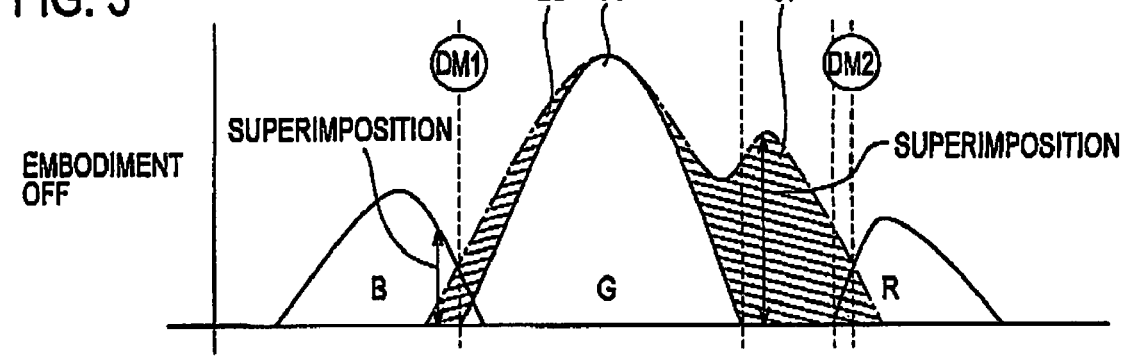
FIG. 5 EMBODIMENT OFF

FIG. 9

| | | POLARIZATION-STATE ADJUSTING ELEMENT 51X | | | LIGHT-INCIDENT-SIDE POLARIZING PLATE 52G |
|---|---|---|---|---|---|
| | COLOR COMPONENT LIGHT | INCIDENT LIGHT | EMITTED LIGHT | | |
| | | | POWER OFF | POWER ON | |
| POLARIZATION-STATE ADJUSTING ELEMENT 51X-1 | LONG/SHORT-WAVELENGTH COMPONENT LIGHT LS | P-POLARIZATION | P-POLARIZATION | S-POLARIZATION | LIGHT-INCIDENT-SIDE POLARIZING PLATE 52G-1 (P-POLARIZATION: TRANSMITTED; S-POLARIZATION: SHIELDED) |
| | CENTRAL-WAVELENGTH COMPONENT LIGHT Gc | | P-POLARIZATION | P-POLARIZATION | |
| POLARIZATION-STATE ADJUSTING ELEMENT 51X-2 | LONG/SHORT-WAVELENGTH COMPONENT LIGHT LS | | S-POLARIZATION | P-POLARIZATION | |
| | CENTRAL-WAVELENGTH COMPONENT LIGHT Gc | | P-POLARIZATION | P-POLARIZATION | |
| POLARIZATION-STATE ADJUSTING ELEMENT 51X-1 | LONG/SHORT-WAVELENGTH COMPONENT LIGHT LS | S-POLARIZATION | S-POLARIZATION | P-POLARIZATION | LIGHT-INCIDENT-SIDE POLARIZING PLATE 52G-2 (S-POLARIZATION: TRANSMITTED; P-POLARIZATION: SHIELDED) |
| | CENTRAL-WAVELENGTH COMPONENT LIGHT Gc | | S-POLARIZATION | S-POLARIZATION | |
| POLARIZATION-STATE ADJUSTING ELEMENT 51X-2 | LONG/SHORT-WAVELENGTH COMPONENT LIGHT LS | | P-POLARIZATION | S-POLARIZATION | |
| | CENTRAL-WAVELENGTH COMPONENT LIGHT Gc | | S-POLARIZATION | S-POLARIZATION | |

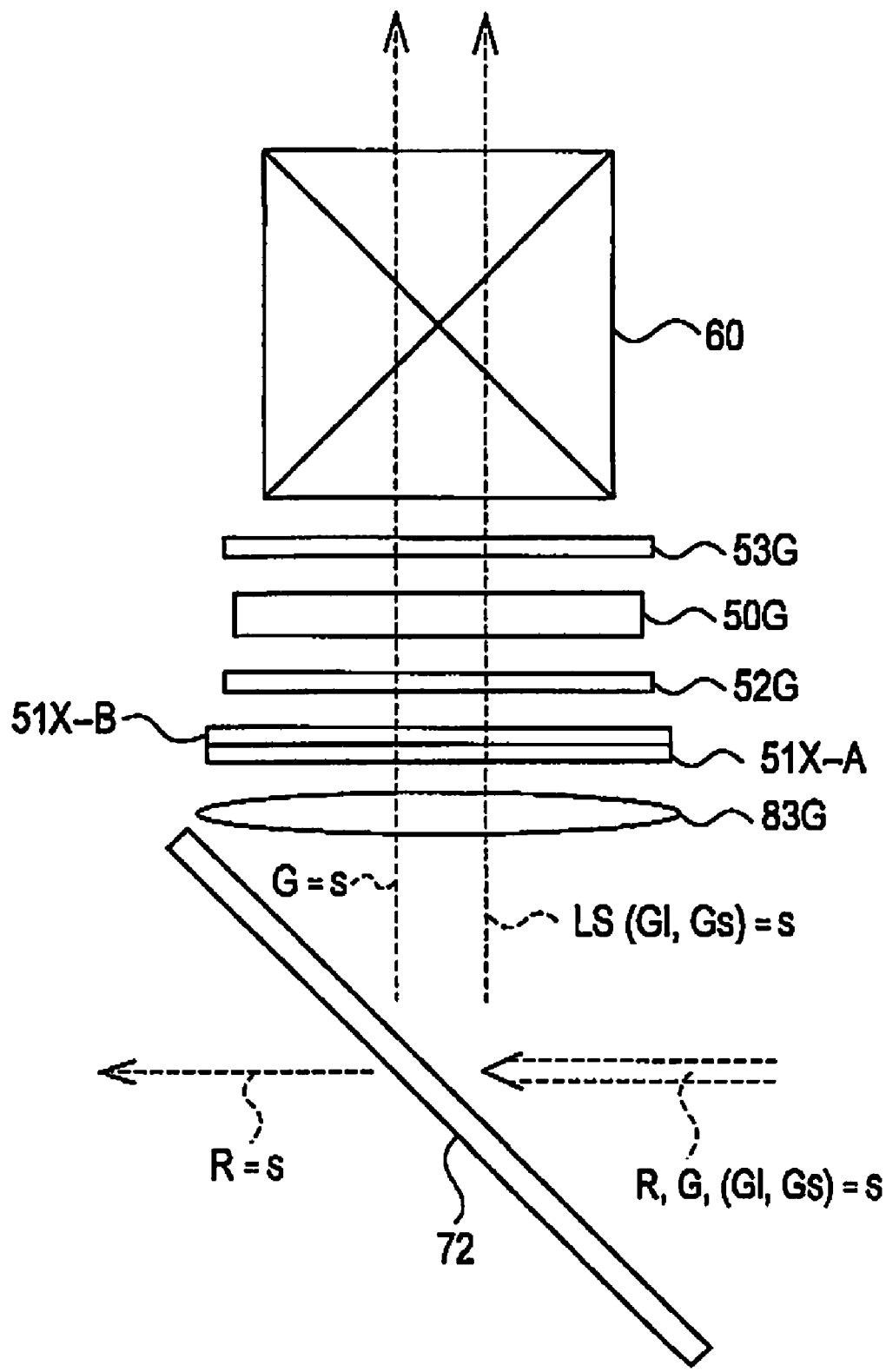

ILLUMINATION APPARATUS AND PROJECTION DISPLAY APPARATUS

CROSS REFERENCE TO RELATED APPLICATIONS

This application is based upon and claims the benefit of priority from prior Japanese Patent Application No. 2008-206232, filed on Aug. 8, 2008; the entire contents of which are incorporated herein by reference.

BACKGROUND OF THE INVENTION

1. Field of the Invention

The present invention relates to an illumination apparatus and a projection display apparatus that use a red component light, a green component light, and a blue component light.

2. Description of the Related Art

Heretofore, there has been known a projection display apparatus that includes: three light valves corresponding respectively to light beams of three colors; a cross dichroic cube configured to combine light beams emitted from the three light valves; and projection means configured to project the light beams combined by the cross dichroic cube.

Here, the cross dichroic cube has: three light-incident surfaces on which light beams are incident; and a single light-emitting surface from which light beams are emitted. Accordingly, when light beams of three colors are to be incident on the cross dichroic cube, the projection display apparatus needs only a single cross dichroic cube.

Meanwhile, for the purpose of improving color reproducibility and brightness, there has been proposed a projection display apparatus using light beams of four or more colors. For example, the projection display apparatus has improved color reproducibility and brightness by using, for example, orange, yellow, or cyan in addition to three colors of red, green, and blue (for example, see Japanese Patent Application Publication No. 2002-287247 (Claims 1 and 4, FIG. 1, and the like)).

In this respect, when the projection display apparatus has light beams of four or more colors, it is impossible to combine the light beams of four or more colors by only a single cross dichroic cube. For this reason, the projection display apparatus needs to include multiple dichroic cubes (or, cross dichroic cubes).

For example, assume a case where light beams of four colors need to be combined with one another. In this case, the projection display apparatus firstly obtains two combined light beams each by combining light beams of two colors, and further combines the two combined light beams with each other so as to obtain a combined light beam of four colors. It should be noted that the projection display apparatus may obtain a combined light beam of four colors by firstly obtaining a combined light beam of three colors, and then combining the combined light beam of three colors with a light beam of a single color. Alternatively, the projection display apparatus may obtain a combined light beam of four colors by firstly obtaining a combined light beam of two colors, and then combining the combined light beam of two colors with light beams of two colors.

In this regard, it is necessary that multiple dichroic cubes (or, cross dichroic cubes) be provided between the light valves and the projection means. For this reason, the back focus of the projection means is made long.

Consequently, the attempt to improve color reproducibility and brightness results in an increase in cost of the entire projection display apparatus because the projection means that is employed in the projection display apparatus using light beams of three colors cannot be utilized for such projection display apparatuses using four or more color light beams.

SUMMARY OF THE INVENTION

An illumination apparatus according to a first aspect includes: a light source (a light source 10) configured to emit white light; a color separator (a dichroic mirror 71 and a dichroic mirror 72) configured to separate the white light emitted by the light source into a first color component light having a first wavelength band, a second color component light having a second wavelength band, and a third color component light having a third wavelength band; a first light valve (for example, a liquid crystal panel 50R) configured to modulate the first color component light on the basis of a first input signal; a second light valve (or example, a liquid crystal panel 50G) configured to modulate the second color component light on the basis of a second input signal; a third light valve for example, a liquid crystal panel 50B) configured to modulate the third color component light on the basis of a third input signal; and a color combiner (a cross dichroic prism 60) configured to combine the first color component light emitted from the first light valve, the second color component light emitted from the second light valve, and the third color component light emitted from the third light valve. The illumination apparatus includes a polarization-state adjusting element (a polarization-state adjusting element 51X) provided on the light-incident-side of the second light valve. In the illumination apparatus, the second wavelength band has a central-wavelength band, a short-wavelength band on the shorter wavelength side than the central-wavelength band, and a long-wavelength band on the longer wavelength side than the central-wavelength band. The polarization-state adjusting element is configured to separately adjust a polarization state of light in the central-wavelength band and a polarization state of light in each of the short-wavelength band and the long-wavelength band.

According to the first aspect, the polarization-state adjusting element separately adjusts the polarization state of light in the central-wavelength band and the polarization state of light in each of the short-wavelength band and the long-wavelength band. For this reason, a mode with priority given to color reproducibility (a color reproducibility priority mode) and a mode with priority given to brightness (a brightness priority mode) can be switched from one to the other.

According to the first aspect, the second color component light emitted from the polarization-state adjusting element is incident on the second light valve. In other words, three types of light are incident on the color combiner. As a result, there is no need to change the design of the projection lens unit, thereby suppressing an increase in cost of the entire apparatus.

In the first aspect the long-wavelength band has a wavelength band wider than that of the short-wavelength band.

In the first aspect, the polarization-state adjusting element is an edge filter element configured not to adjust the polarization state of light in the central-wavelength band but to adjust the polarization state of light in each of the short-wavelength band and the long-wavelength band.

In the first aspect, the polarization-state adjusting element is formed of a combination of: a first notch filter element configured not to adjust the polarization state of light in the central-wavelength band but to adjust the polarization state of light in the short-wavelength band; and a second notch filter element configured not to adjust the polarization state of light in the central-wavelength band but to adjust the polarization state of light in the long-wavelength band.

In the first aspect, the second wavelength band includes at least a green wavelength band.

A projection display apparatus according to a second aspect includes: a light source configured to emit white light; color separators configured to separate the white light emitted by the light source into a first color component light having a first wavelength band, a second color component light having a second wavelength band, and a third color component light having a third wavelength band; a first light valve configured to modulate the first color component light on the basis of a first input signal; a second light valve configured to modulate the second color component light on the bas of a second input signal; a third light valve configured to modulate the third color component light on the basis of a third input signal; a color combiner configured to combine the first color component light emitted from the first light valve, the second color component light emitted from the second light valve, and the third color component light emitted from the third light valve; and projection means configured to project light emitted from the color combiner. The projection display apparatus comprises a polarization-state adjusting element provided on the light-incident-side of the second light valve. In the projection display apparatus, the second wavelength band has a central-wavelength band, a short-wavelength band on the shorter wavelength side than the central-wavelength band, and a long-wavelength band on the longer wavelength side than the central-wavelength band The polarization-state adjusting element separately adjusts a polarization state of light in the central-wavelength band and a polarization state of light in each of the short-wavelength band and the long-wavelength band.

BRIEF DESCRIPTION OF THE DRAWINGS

FIG. 2 is a diagram for explaining an illumination apparatus according to a conventional technique (1).

FIG. 3 is a diagram for explaining an illumination apparatus according to a conventional technique (2).

FIG. 4 is a diagram for explaining an illumination apparatus according to the first embodiment.

FIG. 5 is another diagram for explaining the illumination apparatus according to the first embodiment.

FIG. 9 is a diagram for explaining the function of the polarization-state adjusting element 51X according to the first embodiment.

FIG. 13 is a diagram showing a schematic configuration near a polarization-state adjusting element 51X according to a second embodiment.

DETAILED DESCRIPTION OF THE EMBODIMENTS

Hereinafter, projection display apparatuses according to embodiments of the present invention will be described with reference to the drawings. Throughout the drawings, the same or similar portions will be denoted by the same or similar reference symbols.

It should be noted that the drawings are all schematic and that proportions and the like of dimensions are different from actual ones. Thus, specific dimensions and the like should be determined with the description below taken into consideration. Additionally, these drawings include portions where relations or proportions of dimensions are different therebetween.

[First Embodiment]
(Configuration of Projection Display Apparatus)

Figure 1:
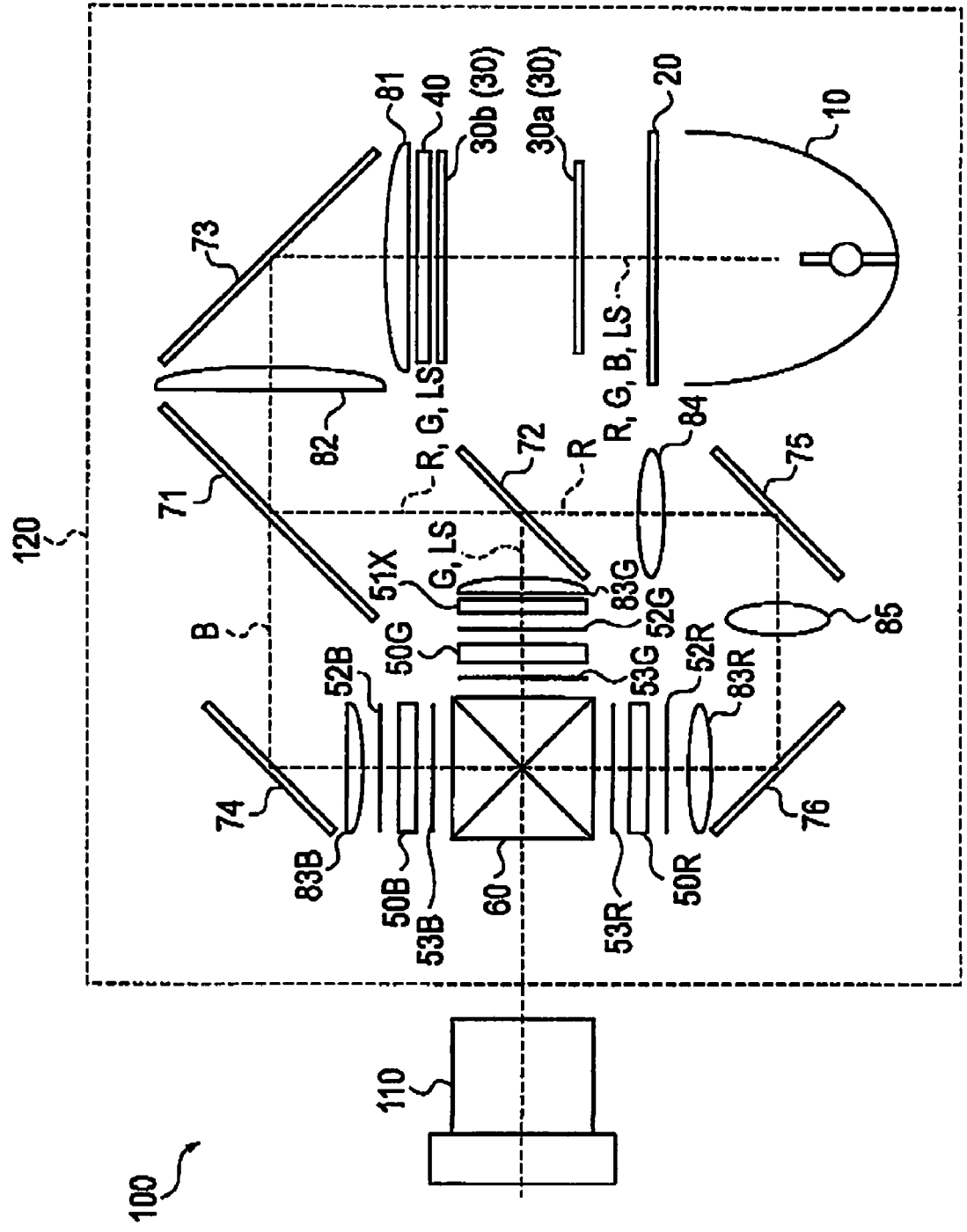
FIG. 1 is a diagram showing a configuration of a projection display apparatus 100 according to a first embodiment of the present invention.

A configuration of a projection display apparatus according to a first embodiment of the present invention will be described below with reference to the drawings. FIG. 1 is a diagram showing a configuration of the projection display apparatus 100 according to the first embodiment.

As shown in FIG. 1, the projection display apparatus 100 includes a projection lens unit 110, and an illumination apparatus 120. The projection display apparatus 100 utilizes a red component light R, a green component light G, and a blue component light B, which will be described later.

In the first embodiment, the red component light R is a light (a first color component light) having at least a red wavelength band (a first wavelength band). The green component light G is a light (a second color component light) having at least a green wavelength band (a second wavelength band). The blue component light B is a light (third color component light) having at least a blue wavelength band (a third wavelength band).

In the first embodiment, the green wavelength band (the second wavelength band) includes: a central-wavelength band; a short-wavelength band located on a shorter wavelength side than the central-wavelength band; and a long-wavelength band located on the longer wavelength side than the central-wavelength band. Hereinafter, light having the central-wavelength band will be referred to as a "central-wavelength component light Gc." Light having the short-wavelength band will be referred to as a "short-wavelength component light Gs." Light having the long-wavelength band will be referred to as a "long-wavelength component light Gl." Note that, the short-wavelength component light Gs and the long-wavelength component light Gl will be collectively referred to as a "long/short-wavelength component light LS."

In the first embodiment, the long-wavelength component light Gl has a wavelength band of an intermediate color located on the long-wavelength side. The intermediate color on the long-wavelength side is a color having a hue between green and red. Specifically, the long-wavelength-side intermediate color includes a color having a hue between green and red (for example, yellow and orange).

In the first embodiment, the short-wavelength component light Gs has a wavelength band of an intermediate color on the short-wavelength side. The short-wavelength-side intermediate color includes a color having a hue between blue and green (for example, a part of cyan (on the long-wavelength side)).

The projection lens unit 110 projects image light emitted by the illumination apparatus 120 onto a screen (not illustrated) or the like.

The illumination apparatus 120 includes a light source 10, a UV/IR cut filter 20, a fly-eye lens unit 30, a PBS array 40, multiple liquid crystal panels 50 (a liquid crystal panel 50R, a liquid crystal panel 50G, and a liquid crystal panel 50B), a polarization-state adjusting element 51X, a cross dichroic prism 60, a mirror group 70, and a lens group 80.

The light source 10 is a UHP lamp or the like, which emits white light. In other words, light emitted by the light source 10 includes the red component light E, the green component light G, and the blue component light B. The green component light G includes the central-wavelength component light Gc, the long-wavelength component light Gl, and the short-wavelength component light Gs.

The UV/IR cut filter 20 transmits a visible light component (the red component light R, the green component light G, and the blue component light B). The UV/IR cut filter 20 shields an infrared light component and an ultraviolet light component.

The fly-eye lens unit 30 uniformizes light emitted by the light source 10. Specifically, the fly-eye lens unit 30 is formed of a fly-eye lens 80a and a fly-eye lens 30b. Each of the fly-eye lens 30a and the fly-eye lens 80b is formed of multiple minute lenses. Each minute lens collects light emitted by the light source 10 so that the light emitted by the light source 10 can be applied to the entire surfaces of the liquid crystal panels 50.

The Polarized Beam Splitter (PBS) array 40 uniformly converts the polarization state of light emitted from the fly-eye lens unit 30 into a single polarization state. For example, the PBS array 40 uniformly converts the light emitted from the fly-eye lens unit 80 into S-polarization (or, P-polarization).

The liquid crystal panel 50R modulates the red component light R by rotating the polarization direction of the red component light R. A light-incident-side polarizing plate 52R is provided on a side where light is incident on the liquid crystal panel 50R. The light-incident-side polarizing plate 52R transmits light having one polarization direction (for example, S-polarization), and shields light having the other polarization direction (for example, P-polarization). A light-emitting-side polarizing plate 53R is provided on a side where light is emitted from the liquid crystal panel 50R. The light-emitting-side polarizing plate 53R shields light having one polarization direction (for example, S-polarization), and transmits light having the other polarization direction (for example, P-polarization).

The liquid crystal panel 50G modulates the green component light G by rotating a polarization direction of the green component light G. A light-incident-side polarizing plate 52G is provided on a side where light is incident on the liquid crystal panel 50G. The light-incident-side polarizing plate 52G transmits light having one polarization direction (for example, S-polarization), and shields light having the other polarization diction or example, P-polarization). Meanwhile, a light-emitting-side polarizing plate 53G is provided on a side where light is emitted from the liquid crystal panel 50G. The light-emitting-side polarizing plate 58G shields light having one polarization direction (for example, S-polarization), and transmits light having the other polarization direction (for example, P-polarization). It should be noted that the green component light G includes the central-wavelength component light Gc, the long-wavelength component light Gl, and the short-wavelength component light Gs.

The liquid crystal panel 50B modulates the blue component light B by rotating the polarization direction of the blue component light B. A light-incident-side polarizing plate 52B is provided on a side where light is incident on the liquid crystal panel 50B. The light-incident-side polarizing plate 62B transmits light having one polarization direction (for example, S-polarization), and shields light having the other polarization direction (for example, P-polarization). Meanwhile, a light-emitting-side polarizing plate 53B is provided on a side where light is emitted from the liquid crystal panel 50B. The light-emitting-side polarizing plate 53B shields light having one polarization direction (or example, S-polarization), and transmits light having the other polarization direction (for example, P-polarization).

Here, each of the liquid crystal panels 50 (the liquid crystal panel 50R, the liquid crystal panel 50G, and the liquid crystal panel 50B) is provided with a compensator (not illustrated) so as to improve contrast ratio and transmittance. In addition, each of the polarizing plates (a light-incident-side polarizing plate 52R, a light-incident-side polarizing plate 52G, a light-incident-side polarizing plate 52B, a light-emitting-side polarizing plate 53R, a light-emitting-side polarizing plate 53G, and a light-emitting-side polarizing plate 53B) may include a pre-polarizing plate, which reduces the amount of light incident on the polarizing plate as well as the heat load thereon.

Preferably, the red component light R and the blue component light B incident on the cross dichroic prism 60 have the S-polarizations, and the green component light G incident on the cross dichroic prism 60 has the P-polarization. The polarization direction of each component light depends on an arrangement of optical elements, and a ½ λ wave plate may be used for adjusting the polarization direction of the red component light R and the blue component light B into the S-polarization.

The polarization-state adjusting element 51X is located between a condenser lens 83G to be described later and the light-incident-side polarizing plate 52G, and is provided on an optical path of the green component light G separated by a dichroic mirror 72. The polarization-state adjusting element 51X adjusts the polarization state of the long/short-wavelength component light LS, and thus transmits the green component light G. On the other hand, the polarization-state adjusting element 51X does not adjust the polarization state of the central-wavelength component light Gc, and thus transmits the green component light G.

Here, the polarization-state adjusting element 51X is an optical element configured to be capable of selectively making changes between a state where the polarization direction of the long/short-wavelength component light LS is not adjusted (rotated) and a state where the polarization direction of the long/short-wavelength component light LS is adjusted (rotated) by 90°. It should be noted that the polarization-state adjusting element 51X will be described in detail later (see FIGS. 7 and 8).

The cross dichroic prism 60 is a color combiner that combines light beams emitted respectively from the liquid crystal panel 50R, the liquid crystal panel 50G, and the liquid crystal panel 50B. The combined light combined by the cross dichroic prism 60 is guided to the projection lens unit 110.

The mirror group 70 includes a dichroic mirror 71, the dichroic mirror 72, and reflection mirrors 73 to 76.

The dichroic mirror 71 transmits the blue component light B out of light emitted from a condenser lens 82, which will be described later. The dichroic mirror 71 reflects the red component light R and the green component light G out of light emitted from the condenser lens 82.

The dichroic mirror 72 transmits the red component light R out of light reflected by the dichroic mirror 71. The dichroic mirror 72 reflects the green component light G out of light transmitted through the dichroic mirror 71.

The reflection minor 73 reflects light (the red component light R, the green component light G, and the blue component light B) emitted from a condenser lens 81, and thus guides the reflected light toward the dichroic mirror 71 and the dichroic mirror 74.

The reflection mirror 74 reflects the blue component light B transmitted through the dichroic mirror 71, and thus guides the reflected light toward the liquid crystal panel 50B. The reflection mirror 76 reflects the red component light R transmitted through the dichroic mirror 72, and thus guides the reflected light toward the reflection mirror 76. The reflection mirror 76 reflects the red component light R reflected by the reflection mirror 75, and thus guides the reflected light toward the liquid crystal panel 50R.

The lens group 80 includes the condenser lens 81, the condenser lens 82, a condenser lens 88R, the condenser lens 83G, a condenser lens 83B, a relay lens 84, and a relay lens 85.

The condenser lens 81 collects light transmitted through the UV/IR cut filter 20, the fly-eye lens unit 30, and the PBS array 40. The condenser lens 82 collects light reflected by the reflection mirror 73.

The condenser lens 83R substantially collimates the red component light R so that the liquid crystal panel 50H should be irradiated with the red component light R. The condenser lens 83G substantially collimates the green component light G so that the liquid crystal panel 50G should be irradiated with the green component light G. The condenser lens 83B substantially collimates the blue component light B so that the liquid crystal panel 50B should be irradiated with the blue component light B.

The relay lens 84 and the relay lens 85 substantially form an image of the red component light R on the liquid crystal panel 50R, while suppressing an enlargement of the red component light R.

(Difference Between Conventional Technique and Embodiment)

Hereinbelow, the difference between the conventional technique and the embodiment will be described. Specific, a conventional technique (1), a conventional technique (2), and the embodiment will be described in this order with reference to FIGS. 2 to 5.

In the following description, a cutoff wavelength of the dichroic mirror which separates the blue component light B and the green component light G is represented as a "DM1". In addition, a cutoff wavelength of the dichroic mirror which separates the green component light G and the red component light R is represented as a "DM2".

Note that, the dichroic mirror separates color component light beam into two color component light beams, in accordance with the cutoff wavelength. However, it should be noted that the dichroic mirror is not capable of completely separating the color component light beam into two color component light beams. Therefore, attention should be paid to the fact that, after separation of the color component light beam, one separated color component light beam (on the short-wavelength side) includes light with a longer wavelength side than the cutoff wavelength. Similarly, attention should be paid to the fact that, after separation of the color component light beam, the other separated color component light beam (on the long-wavelength side) includes light with a shorter wavelength than the cutoff wavelength.

Firstly, an illumination apparatus according to the conventional technique (1) will be described with reference to FIG. 2. Note that the illumination apparatus according to the conventional technique (1) does not utilize a yellow component light Ye.

As shown in FIG. 2, the DM1 is provided in a wavelength band of an intermediate color having a hue between blue and green. For example, the DM1 is in a range of 496 nm to 510 nm. The DM2 is provided in a wavelength hand of an intermediate color having a hue between green and red. For example, the DM2 is in a range of 585 nm to 600 nm.

Here, the illumination apparatus according to the conventional technique (1) is provided with a cut filter for cutting off the yellow component light Ye. Here, a cutoff wavelength of the cut filter is represented as "CF". The CF is provided in a wavelength band of an intermediate color having a hue between green and red. For example, the CF is in a rage of 575 nm to 595 nm. It should be noted here that the cut filter is more capable of sharply cutting off the yellow component light Ye by using the CF as a border than the dichroic mirror.

In should be noted that light having a wavelength band sandwiched between the CF and the DM2 is cut off. In FIG. 2, the CF is provided on the shorter wavelength side than the DM2. Instead, the CF may be provided on the longer wavelength side than the DM2. In such a case, it is a matter of course that the DM2 is shifted to the short-wavelength side.

Secondly, an illumination apparatus according to the conventional technique (2) will be described with reference to FIG. 3. The illumination apparatus according to the conventional technique (2) has: a brightness priority mode with use of the yellow component light Ye; and a color reproducibility priority mode without use of the yellow component light Ye. Note that, in the color reproducibility priority mode, only light on the long-wavelength side of the green component light G is cut off.

As shown in FIG. 3, the DM1 is provided in a wavelength band of an intermediate color having a hue between blue and green. For example, the DM1 is in a range of 495 mm to 510 nm as in the case of the DM1 according to the conventional technique (1). The DM2 is provided in a wavelength band of an intermediate color having a hue between green and red. For example, the DM2 is in a range of 585 nm to 600 nm.

Here, the illumination apparatus according to the conventional technique (2) is provided with a selective superimposing optical element for selectively cutting off the yellow component light Ye. The selective superimposing optical element transmits the yellow component light Ye in the brightness priority mode. On the other hand, the selective superimposing optical element cuts off the yellow component light Ye in the color reproducibility priority mode. When the selective superimposing optical element cuts off the yellow component light Ye in the color reproducibility priority mode, the cutoff wavelength on the short-wavelength side is, for example, in a range of 575 nm to 595 nm as in the case of the CP according to the conventional technique (1).

It should be noted here that the selective superimposing optical element is more capable of sharply cutting off the yellow component light Ye by using the cutoff wavelength on the short-wavelength side as a border than the dichroic mirror.

Thirdly, an illumination apparatus according to the embodiment will be described with reference to FIGS. 4 and 5. The illumination apparatus according to the embodiment has; a brightness priority mode with use of the long/short-wavelength component light LS; and a color reproducibility priority mode without use of the long/short-wavelength component light LS. The long/short-wavelength component light LS includes the long-wavelength component light Gl and the short-wavelength component light Gs. Both the long-wavelength component light Gl and the short-wavelength component light Gs are cut off in the color reproducibility priority mode. The long-wavelength component light Gl may be correspond to a yellow component light Ye, and the short-wavelength component light Gs may be correspond to a cyan component light Cy.

As shown in FIGS. 4 and 5, the DM1 is provided in a wavelength band of an intermediate color having a hue between blue and green. The DM1 is, for example, in a range of 495 nm to 510 nm as in the case of the DM1 according to the conventional technique (1).

The DM2 is provided in a wavelength band of an intermediate color having a hue between green and red. The DM2 is, for example, in a range of 590 nm to 610 nm. In other words, the DM2 according to the embodiment is provided on the longer wavelength side than the DM2 according to the conventional technique (1) and the DM2 according to the conventional technique (2). For this reason, it should be noted that the wavelength band of the long-wavelength component light Gl is wider than the wavelength band of the short-wavelength component light Gs.

Here, the illumination apparatus according to the embodiment is provided with a polarization-state adjusting element for selectively cutting off the long/short-wavelength component light LS. In the brightness priority mode, the polarization-state adjusting element adjusts the polarization state of the long/short-wavelength component light LS so that the long/short-wavelength component light LS should reach the liquid crystal panel 50G. On the other hand, in the color reproducibility priority mode, the polarization-state adjusting element adjusts the polarization state of the long/short-wavelength component light LS so that the long/short-wavelength component light LS should not reach the liquid crystal panel 50G.

When the polarization-state adjusting element cuts off the long-wavelength component light Gl in the color reproducibility priority mode, the cutoff wavelength on the short-wavelength side is, for example, in a range of 575 nm to 596 nm as in the case of the CF according to the conventional technique (1). When the polarization-state adjusting element cuts off the short-wavelength component light Gs in the color reproducibility priority mode, the cutoff wavelength on the long-wavelength side is, for example, in a range of 500 nm to 515 nm.

In other words, in the brightness priority mode according to the embodiment, all the green component light G and the long/short-wavelength component light LS are used as shown in FIG. 4. On the other hand, in the color reproducibility priority mode according to the embodiment, the long/short-wavelength component light LS is cut off and thus only the green component light G is used as shown in FIG. 5. In the color reproducibility priority mode, the lower limit of the wavelength band of the green component light G is in a range of 500 nm to 515 nm, while the upper limit of the wavelength band of the green component light G is in a range of 565 nm to 580 nm.

As described above, in the brightness priority mode according to the embodiment, brightness can be secured in the same level as the conventional technique (2). Note that, in the brightness priority mode according to the embodiment, it is a matter of course that brightness can be secured in a higher level than the conventional technique (1).

Meanwhile, in the color reproducibility priority mode according to the embodiment, the DM2 shifts to the long-wavelength side, so that the purity of red reproduced by the red component light R is higher than those of the conventional technique (1) and the conventional technique (2). In the color reproducibility priority mode according to the embodiment, the long-wavelength component light Gl and the short-wavelength component light Gs are cut off, so that the purity of green reproduced by the green component light G is higher than those of the conventional technique (1) and the conventional technique (2). In the color reproducibility priority mode according to the embodiment, the short-wavelength component light Gs is cut off in addition to the long-waves component light Gl, so that green reproduced by the green component light G can be prevented from shifting to the blue side.

(Configuration of Polarization-State Adjusting Element)

Figure 6:
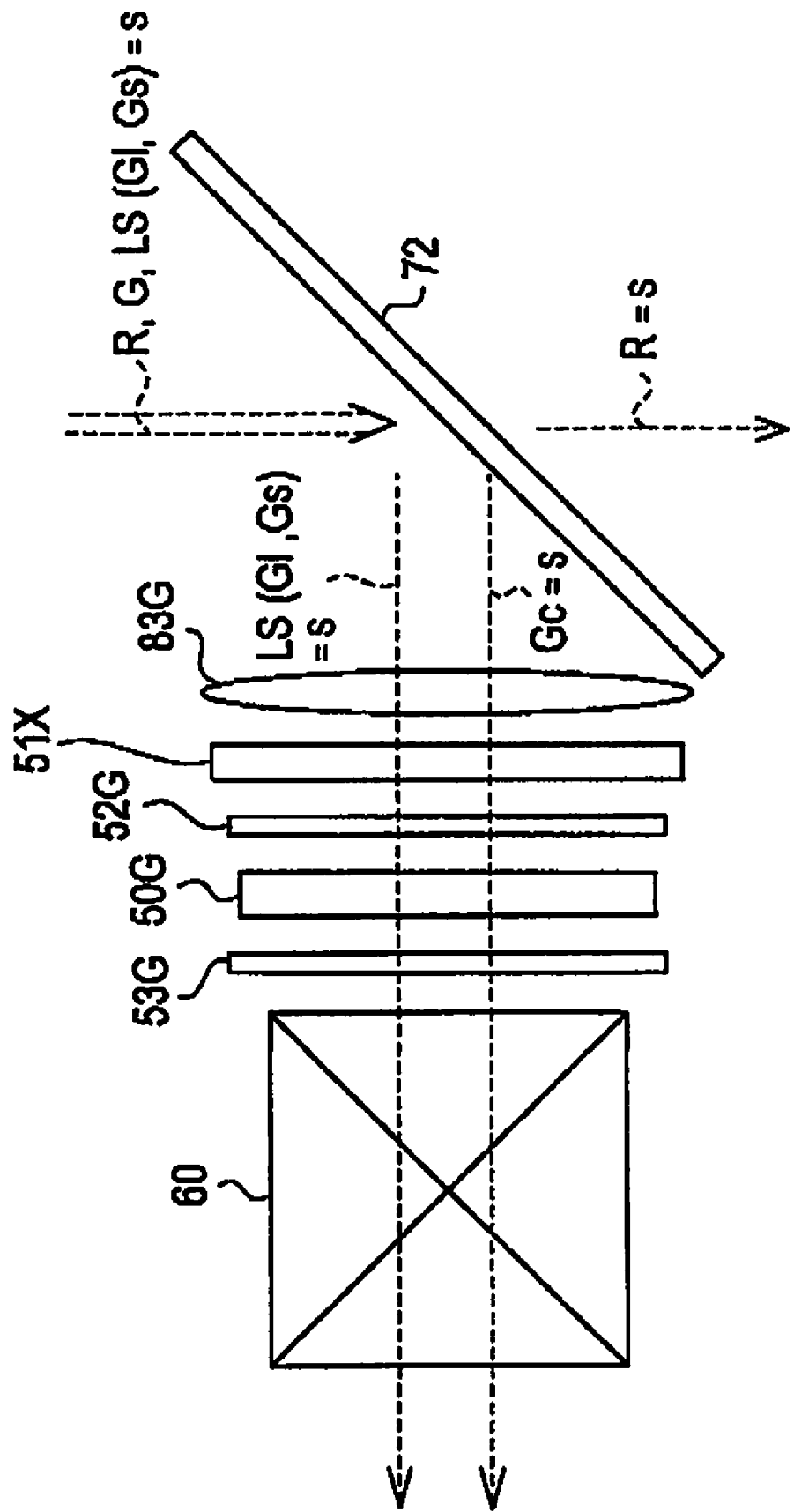
FIG. 6 is a diagram showing a schematic configuration near a polarization-state adjusting element 51X according to the first embodiment.

Hereinbelow, a mechanism for improving green color purity and red color purity in the color reproducibility priority mode will be described. Specifically, a configuration of the polarization-state adjusting element according to the embodiment will be described with reference to the drawings. FIG. 6 is a diagram showing a schematic configuration near the polarization-state adjusting element 51X according to the first embodiment.

As shown in FIG. 6, the long/short-wavelength component light LS, i.e. the long-wavelength component light Gl and the short-wavelength component light Gs, is reflected by the dichroic minor 72. Similarly, the central-wavelength component light Gc is reflected by the dichroic mirror 72. Thus, the central-wavelength component light Gc and the long/short-wavelength component light LS are guided to the polarization-state adjusting element 51X.

Here, when the polarization state of the long/short-wavelength component light LS is adjusted by the polarization-state adjusting element 51X, the long/short-wavelength component light LS is shielded by the light-incident-side polarizing plate 52G. Here, when the polarization state of the long/short-wavelength component light LS is not adjusted by the polarization-state adjusting element SIX, the long/short-wavelength component light LS is transmitted through the light-incident-side polarizing plate 52G.

Figure 7A:
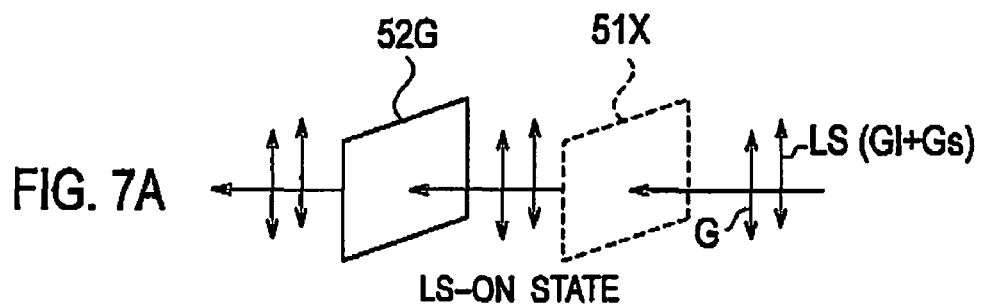
FIGS. 7A and 7B are diagrams each showing the polarization-state adjusting element 51X according to the first embodiment.

As shown in FIG. 7A, in an LS-ON state, the polarization-state adjusting element 51X transmits the long/short-wavelength component light LS without adjusting the polarization state of the long/short-wavelength component light LS. In other words, on the light-emitting-side of the polarization-state adjusting element 51X, the polarization state of the long/short-wavelength component light LS is the same as the polarization state of the central-wavelength component light Gc. The LS-ON state is a state where the long/short-wavelength component light LS is used.

Figure 7B:
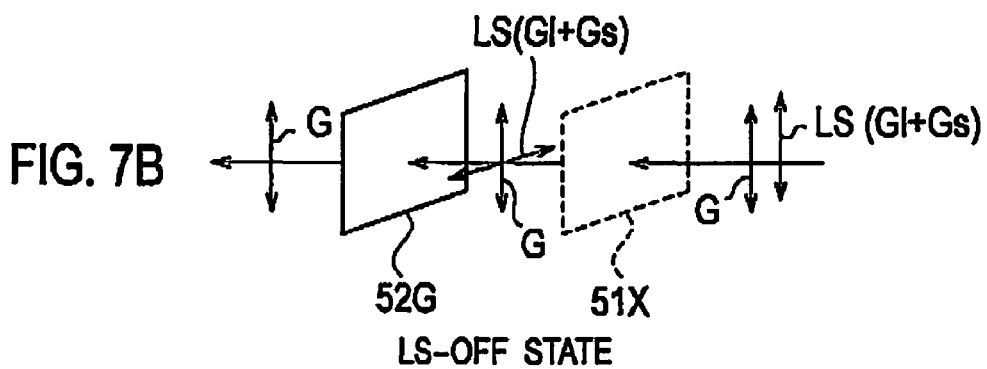

As shown in FIG. 7B, in an LS-OFF state, the polarization-state adjusting element 51X transmits the long/short-wavelength component light LS while adjusting the polarization state of the long/short-wavelength component light LS. In other words, on the light-emitting-side of the polarization-state adjusting element 51X, the polarization state of the long/short-wavelength component light LS is different from the polarization state of the central-wavelength component light Gc. The LS-OFF state is a state where the long/short-wavelength component light LS is not used.

Note that, the present embodiment is described on the assumption that the LS-ON state is a state where no voltage is applied to the polarization-state adjusting element 51X (POWER OFF); however, the LS-OFF state includes a state where a low voltage is applied to the polarization-state adjusting element 51X (a low-voltage application state).

Note that, the present embodiment is described on the assumption that the LS-OFF state is a state where a voltage is applied to the polarization-state adjusting element 51X (POWER ON); however, the LS-ON state includes a state where a high voltage is applied to the polarization-state adjusting element 51X (a high-voltage application state).

As shown in FIGS. 7A and 7B, the amount of the long/short-wavelength component light LS reaching the cross dichroic prism 60 is controlled by witching between the LS-ON state and the LS-OFF state. In other words, the polarization-state adjusting element 51X adjusts the polarization state of the long/short-wavelength component light LS, so that the mode is switched between the mode with priority given to color reproducibility (the color reproducibility priority mode) and the mode with priority given to brightness (the brightness priority mode).

Figure 8:
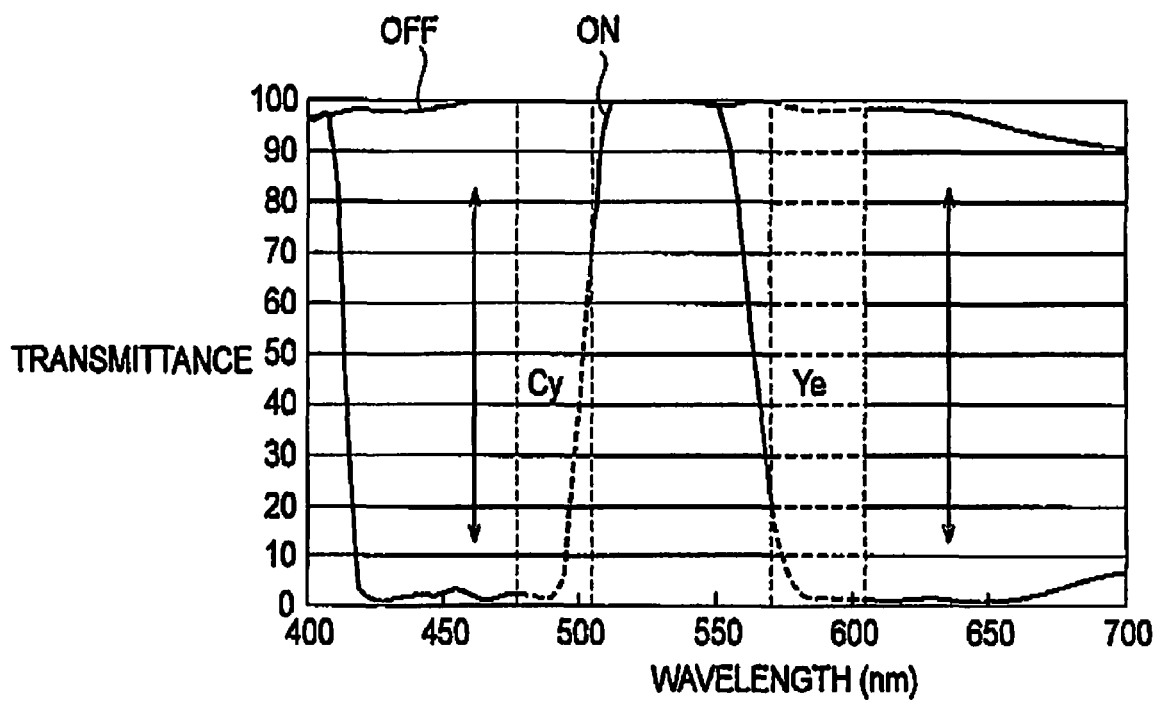
FIG. 8 is a diagram for explaining an edge filter element according to the first embodiment.

Hereinbelow, a case where an edge filter element is used as the polarization-state adjusting element 51X will be described FIG. 8 is a diagram for explaining the edge filter element according to the first embodiment.

As shown in FIG. 8, the polarization-state adjusting element 51X of the edge filter type does not adjust (rotate) the polarization direction of either of color component light beams (the central-wavelength component light Gc and the long/short-wavelength component light LS), in a state where no voltage is applied to the polarization-state adjusting element 51X (OFF state).

Meanwhile, the polarization-state adjusting element 51X of the edge filter type adjusts (rotates) the polarization direction of the long/short-wavelength component light LS (the long-wavelength component light Gl and the short-wavelength component light Gs) but does not adjust (rotate) the polarization direction of the central-wavelength component light Gc, in a state where a voltage is applied to the polarization-state adjusting element 51X (ON state).

Note that, FIG. 8 shows a ratio (transmittance) in which each of the color component light beams is transmitted through the polarization-state adjusting element 51X of the edge filter type with the polarization direction thereof is not adjusted (rotated) when the color component light beam is incident on the polarization-state adjusting element 51X of the edge filter type. Accordingly, it should be noted that, in FIG. 8, the polarization direction of each color component light beam is adjusted rotated) to a greater extent as the transmittance becomes lower.

(Function of Polarization-State Adjusting Element)

Hereinbelow, the function of the polarization-state adjusting element according to the first embodiment will be described with reference to the drawing. FIG. 9 is a diagram for explaining the function of the polarization-state adjusting element 51X according to the first embodiment.

FIG. 9 shows a combination of the polarization-state adjusting element 51X and the light-incident-side polarizing plate 52G. A polarization-state adjusting element 51X-1 is an element which adjusts (rotates) only the polarization direction of the long/short-wavelength component light LS (the long-wavelength component light Gl and the short-wavelength component light Gs) by 90° when a voltage is applied thereto (POWER ON). Meanwhile, a polarization-state adjusting element 51X-2 is an element which adjusts (rotates) only the polarization direction of the long/short-wavelength component light LS by 90° when no voltage is applied thereto (POWER OFF).

A light-incident-side polarizing plate 52G-1 is an element which transmits light having P-polarization but shields light having S-polarization. The light-incident-side polarizing plate 52G-1 is used, for example, when light emitted by the light source 10 is uniformly converted into P-polarization. Meanwhile, a light-incident-side polarizing plate 52G-2 is an element which transmits light having S-polarization but shields light having P-polarization. The light-incident-side polarizing plate 52G-2 is used, for example, when light emitted by the light source 10 is uniformly converted into S-polarization.

Firstly, consider that the polarization-state adjusting element 51X-1 is used when light emitted by the light source 10 is uniformly converted into P-polarization. In this case, the amount of the long/short-wavelength component light LS reaching the cross dichroic prism 60 becomes the maximum when no voltage is applied to the polarization-state adjusting element 51X-1 (POWER OFF). Note that, when a voltage is applied to the polarization-state adjusting element 51X-1 (POWER ON), the polarization direction of the long/short-wavelength component light LS (S-polarization) is different from the polarization direction of the central-wavelength component light Gc (P-polarization). For this reason, the long/short-wavelength component light LS having S-polarization is shielded by the light-incident-side polarizing plate 52G-1.

Secondly, consider that the polarization-state adjusting element 51X-2 is used when light emitted by the light source 10 is uniformly converted into P-polarization. In this case, the amount of the long/short-wavelength component light LS reaching the cross dichroic prism 60 becomes the maximum when a voltage is applied to the polarization-state adjusting element 51X-2 (POWER ON). Note that, when no voltage is applied to the polarization-state adjusting element 51X-2 (POWER OFF), the polarization direction of the long/short-wavelength component light LS (S-polarization) is different from the polarization direction of the central-wavelength component light Gc (P-polarization). For this reason, the long/short-wavelength component light LS having S-polarization is shielded by the light-incident-side polarizing plate 52G-1.

Thirdly, consider that the polarization-state adjusting element 51X-1 is used when light emitted by the light source 10 is uniformly converted into S-polarization. In this case, the amount of the long/short-wavelength component light LS reaching the cross dichroic prism 60 becomes the maximum when no voltage is applied to the polarization-state adjusting element 51X-1 (POWER OFF). Note that, when a voltage is applied to the polarization-state adjusting element 51X-1 (POWER ON), the polarization direction of the long/short-wavelength component light LS (P-polarization) is different from the polarization direction of the central-wavelength component light Gc (S-polarization). For this reason, the long/short-wavelength component light LS having P-polarization is shielded by the light-incident-side polarizing plate 52G-2.

Fourthly, consider that the polarization-state adjusting element 51X-2 is used when light emitted by the light source 10 is uniformly converted into S-polarization. In this case, the amount of the long/short-wavelength component light LS reaching the cross dichroic prism 60 becomes the maximum when a voltage is applied to the polarization-state adjusting element 51X-2 (POWER ON). Note that, when no voltage is applied to the polarization-state adjusting element 51X-2 (POWER OFF), the polarization direction of the long/short-wavelength component light LS (P-polarization) is different from the polarization direction of the central-wavelength component light Gc (S-polarization). For this reason, the long/short-wavelength component light LS having P-polarization is shielded by the light-incident-side polarizing plate 52G-2.

(Function of Projection Display Apparatus)

Figure 10:
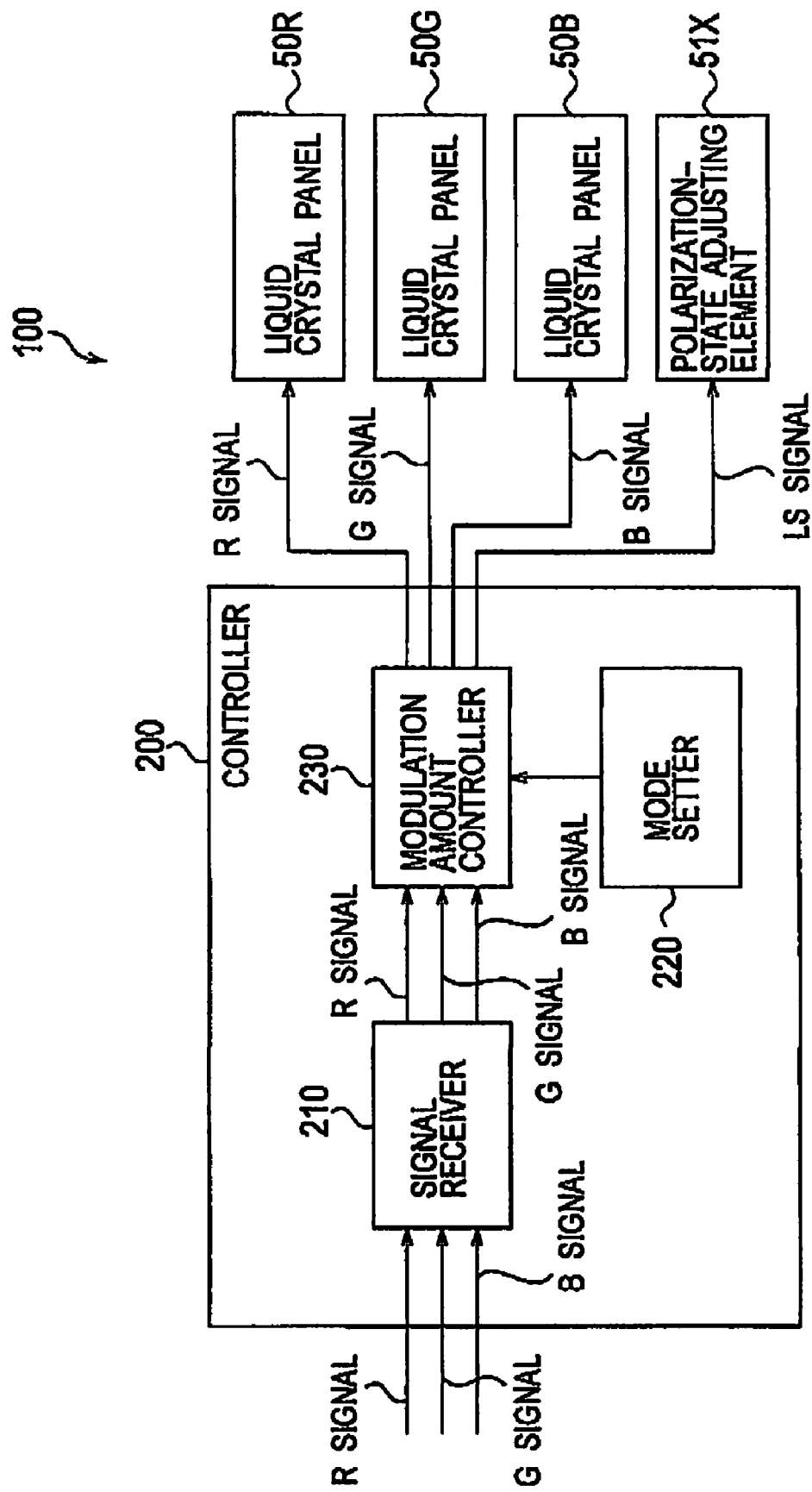
FIG. 10 is a block diagram showing the function of the projection display apparatus 100 according to the first embodiment.

Hereinbelow, the function of the projection display apparatus according to the first embodiment will be described with reference to the drawing. FIG. 10 is a block diagram showing the function of the projection display apparatus 100 according to the first embodiment.

As shown in FIG. 10, the projection display apparatus 100 includes a controller 200. The controller 200 includes a signal receiver 210, a mode setter 220, and a modulation amount controller 230.

The signal receiver 210 receives color signals (a first input signal (hereinafter, referred to as R signal), a second input signal (hereinafter, referred to as G signal), and a third input signal (hereinafter, referred to as B signal)). For example, the signal receiver 210 acquires the color signals from a color separation section configured to separate a color signal from an image signal.

The mode setter 220 controls the mode with priority given to color reproducibility (color reproducibility priority mode) or the mode with priority given to brightness brightness priority mode). Specifically, the mode setter 220 controls whether or not the polarization direction of the long/short-wavelength component light LS (the long-wavelength component light Gl and the short-wavelength component light Gs) is adjusted (rotated) by the polarization-state adjusting element 51X.

The modulation amount controller 230 controls an amount of modulation of each liquid crystal panel 50 (the liquid crystal panel 50R, the liquid crystal panel 50G, and the liquid crystal panel 50B), based on the R signal, the G signal, and the B signal acquired from the signal receiver 210. In addition, the modulation amount controller 230 controls an amount of modulation of the polarization-state adjusting element 51X.

Specifically, the modulation amount controller 280 inputs the R signal into the liquid crystal panel 50R. Similarly, the modulation amount controller 230 inputs the G signal into the liquid crystal panel 50G. Likewise, the modulation amount controller 230 inputs the B signal into the liquid crystal panel 50B.

The modulation amount controller 230 generates an LS signal for controlling the long/short-wavelength component light LS, and inputs the LS signal into the polarization-state adjusting element 51X. Specifically, when the color reproducibility priority mode is selected, the modulation amount controller 230 inputs an LS signal which adjusts the polarization state of the long/short-wavelength component light LS to obtain an LS-OFF state into the polarization-state adjusting element 51X. When the brightness priority mode is selected, the modulation amount controller 230 inputs an LS signal which adjusts the polarization state of the long/short-wavelength component light LS to obtain an LS-ON state into the polarization-state adjusting element 51X.

(Wavelength Band of Each of Color Component Light Beams)

Figure 11:
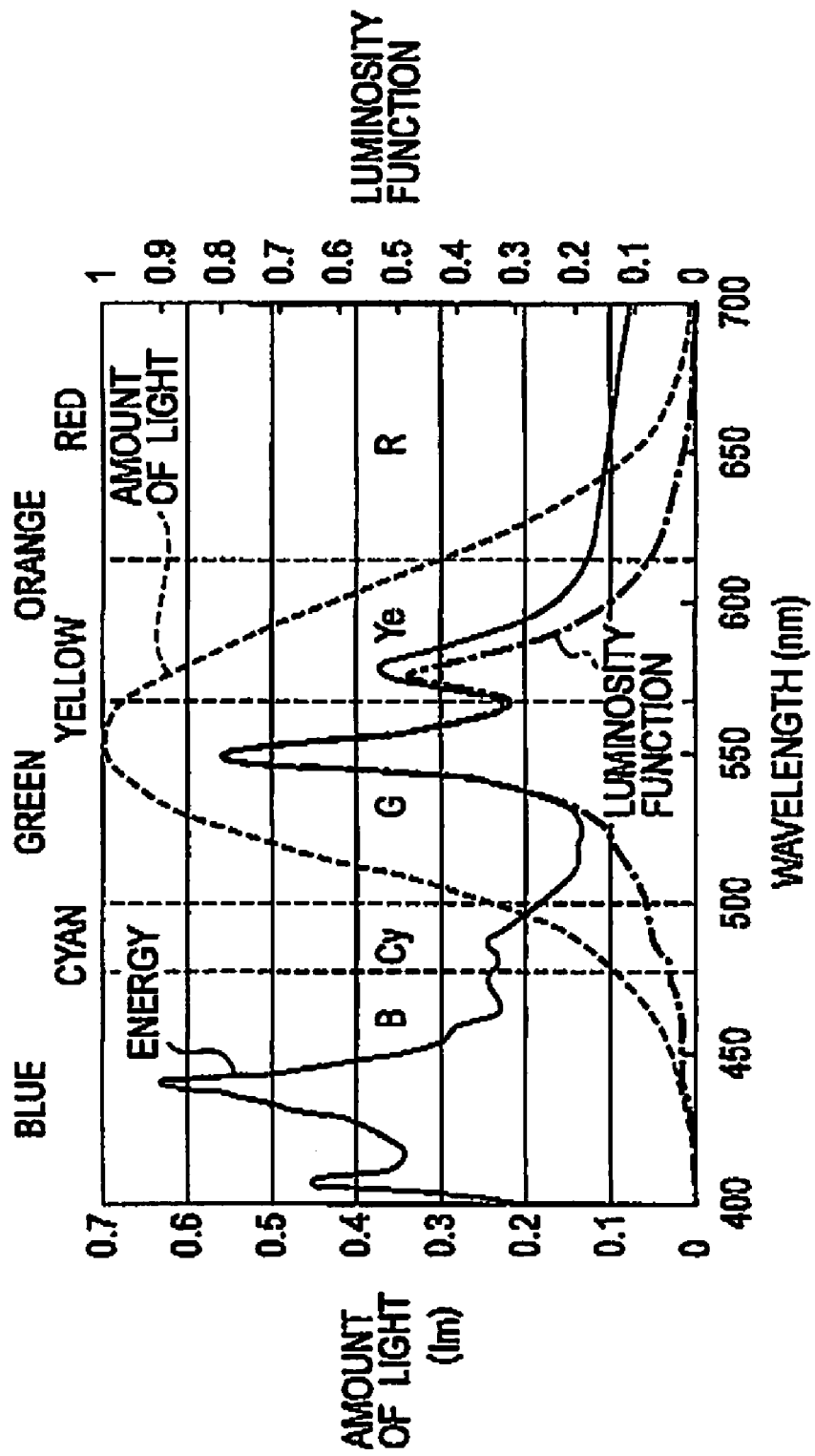
FIG. 11 is a diagram showing wavelength bands respectively for colors according to the first embodiment.

Hereinbelow, the wavelength band of each of color component light beams according to the first embodiment will be described with reference to the drawing. FIG. 11 is a diagram showing the wavelength band of each color component light beam according to the first embodiment.

As shown in FIG. 11, the red component light R is the light (the first color component light) having at least a red wavelength band (the first wavelength band). In the first embodiment, the red component light R has a wavelength band on the longer wavelength side than a wavelength band of a long-wavelength-side intermediate color having a hue between green and red. The long-wavelength-side intermediate color is, for example, yellow and orange.

The blue component light B is the light (the third color component light) having at least a blue wavelength band (the third wavelength band). In the first embodiment, the blue component light B has a wavelength band on the shorter wavelength side than a wavelength band of a short-wavelength-side intermediate color having a hue between blue and green. The short-wavelength-side intermediate color is, for example, a part of cyan (on the long-wavelength side).

The green component light G is the light (the second color component light) at least having a green wavelength band (a second wavelength band). In the first embodiment, the green component light G has a wavelength band on the longer wavelength side than the wavelength band of the short-wavelength-side intermediate color. The green component light G has a wavelength band on the shorter wavelength side than the wavelength band of the long-wavelength-side intermediate color.

As described above, the green component light G includes the central-wavelength component light Gc, the short-wavelength component light Gs, and the long-wavelength component light Gl. In the first embodiment, the long-wavelength component light Gl has the wavelength band of the long-wavelength-side intermediate color (for example, yellow and orange). The short-wavelength component light Gs has the wavelength band of the short-wavelength-side intermediate color or example, a part (on the long-wavelength side) of cyan).

The amount of light emitted by the light source 10 is the product of luminosity function of the light emitted by the light source 10 and energy generated by the light source 10. The amount of light emitted by the light source 10 has a peak in the wavelength band of green and in the wavelength band of yellow.

The luminosity function of the light emitted by the light source 10 is the ratio (relative value) of sensitivity for each wavelength to the highest sensitivity, where energy of light emitted by the light source 10 is the same. The luminosity function of the light emitted by the light source 10 has the peak at the wavelength band of green, and decreases as the wavelength increases from the wavelength band of green to the longer wavelength side (or, decreases to the shorter wavelength side).

As can be seen from the characteristics of the light emitted by the light source 10, light having a yellow wavelength band is preferably used to improve brightness of an image projected onto a screen (not illustrated) or the like, in addition to light having a red wavelength band, light having a green wavelength band, and light having a blue wavelength band.

Here, a cutoff wavelength of the dichroic mirror 71 configured to separate the blue component light B from the other color component lights is provided on the shorter wavelength side than the wavelength band of the short-wavelength-side intermediate color. The cutoff wavelength of the dichroic mirror 71 is, for example, in a range of about 495 nm to 510 nm.

Meanwhile, a cutoff wavelength of the dichroic mirror 72 configured to separate the red component light R from another color component light is provided on the longer wavelength side than the wavelength band of the long-wavelength-side intermediate color. The cutoff wavelength of the dichroic mirror 72 is, for example, in a range of about 595 nm to 605 nm.

In the first embodiment, the cutoff wavelength of the dichroic mirror is provided on the longer wavelength side than that of the conventional technique. Thus, the purity of red reproduced by the red component light R is improved. Meanwhile, in the brightness priority mode, brightness of an image projected onto a screen can be improved because the long-wavelength component light Gl including light having a wavelength band of yellow or orange.

In the first embodiment, in the color reproducibility priority mode, the purity of green reproduced by the green component light G (that is, the central-wavelength component light Gc) is improved because the short-wavelength component light Gs and the long-wavelength component light Gl are cut off.

(Comparison of Color Reproduction Range)

Hereinbelow, the color reproduction range according to the conventional technique and the color reproduction range according to the embodiment will be compared with each other. Specifically, the comparison between the color reproduction range according to the above-mentioned conventional technique (2) and the color reproduction range according to the embodiment will be described with reference to FIG. 12.

Figure 12:
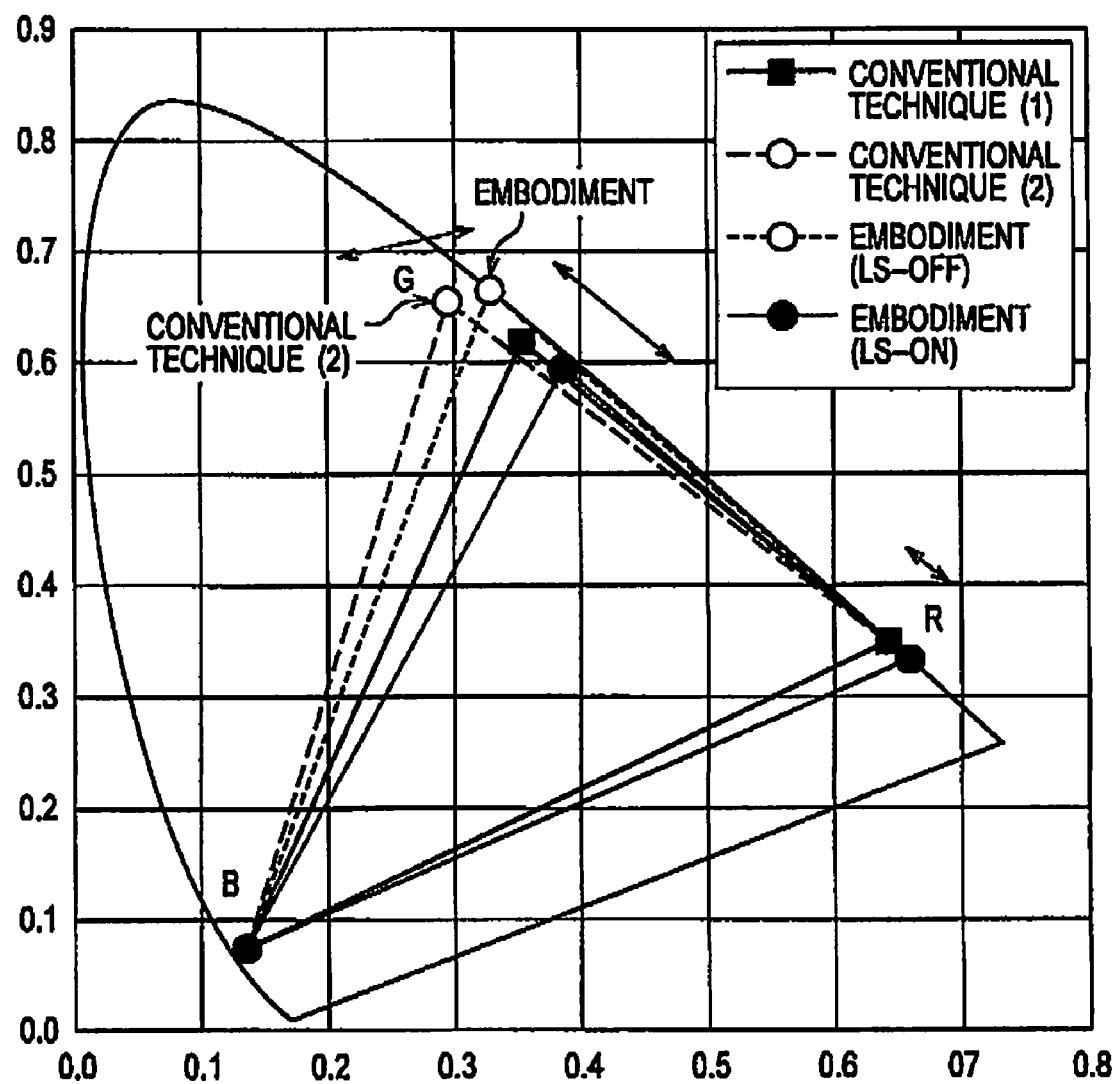
FIG. 12 is a diagram for explaining color reproduction ranges for illumination apparatuses in a comparative evaluation.

As shown in FIG. 12, in the color reproducibility priority mode according to the conventional technique (2), only the yellow component light Ye is cut off by the selective superimposing optical element. Meanwhile, in the color reproducibility priority mode according to the embodiment, the long-wavelength component light Gl and the short-wavelength component light Gs are cut off by the polarization-state adjusting element.

Accordingly, in the color reproducibility priority mode (LS-OFF) according to the embodiment, green reproduced by the green component light G is prevented from shifting to the blue side, as compared with the conventional technique (2). In other words, in the color reproducibility priority mode according to the embodiment, the purity of green reproduced by the green component light G is higher than that of the conventional technique (2).

In the color reproducibility priority mode according to the embodiment, the DM2 is provided on the longer wavelength side than the conventional technique (2). Accordingly, in the color reproducibility priority mode according to the embodiment, the purity of red reproduced by the red component light R is higher than that of the conventional technique (2).

As described above, in the color reproducibility priority mode (LS-OFF) according to the embodiment, the purities of green and red are higher than those of the conventional technique (2), so that the color reproduction range expands properly.

Note that, in the brightness priority mode according to the embodiment (LS-ON), light emitted by the light source is effectively used in the same manner as in the conventional technique (2). Accordingly, in the brightness priority mode according to the embodiment, brightness can be secured in the same level as that of the conventional technique (2).

(Advantages and Effects)

In the first embodiment, the green component light G emitted from the polarization-state adjusting element 51X is incident on the liquid crystal panel 50G or the green component light G. In other words, there are three types of light incident on the cross dichroic prim 60. As a result, the design of the projection lens unit 110 need not be changed and thus an increase in cost of the entire apparatus can be suppressed.

In the first embodiment, the polarization-state adjusting element 51X separately adjusts the polarization state of the central-wavelength component light Gc and the polarization state of the long/short-wavelength component light LS (the long-wavelength component light Gl and the short-wavelength component light Gs). Specifically, the polarization-state adjusting element 51X transmits the central-wavelength component light Gc without adjusting the polarization state of the central-wavelength component light Gc. Meanwhile, the polarization-state adjusting element 51X transmits the long/short-wavelength component light LS (the long-wavelength component light Gl and the short-wavelength component light Gs) while adjusting the polarization state of the long/short-wavelength component light LS. Accordingly, the mode with priority given to color reproducibility (color reproducibility priority mode) and the mode with priority given to brightness (brightness priority mode) can be switched from one to the other.

In the first embodiment, in the color reproducibility priority mode, the purity of green reproduced by the green component light G (the central-wavelength component light Gc) is improved by cutting off the long/short-wavelength component light LS (the long-wavelength component light Gl and the short-wavelength component light Gs) from the green component light G. Meanwhile, in the brightness priority mode, the amount of light guided to the cross dichroic prism 60 is increased because the long/short-wavelength component light LS (the long-wavelength component light Gl and the short-wavelength component light Gs) is included in the green component light G.

In the first embodiment, the long-wavelength component light Gl has the wavelength band of the long-wavelength-side intermediate color or example, yellow and orange). In other words, the red component light R has a wavelength band on the longer wavelength side than the wavelength band of the long-wavelength-side intermediate color. As described above, see the red component light R includes no wavelength band of the long-wavelength-side intermediate color (particularly, orange), the purity of red reproduced by the red component light R is improved.

In the first embodiment, the short-wavelength component light Gs has the wavelength band of the short-wavelength-side intermediate color or example, a part of cyan). In other words, the blue component light B has a wavelength band on the longer wavelength side than the wavelength band of the short-wavelength-side intermediate color. As described above, since the blue component light B includes no wavelength band of the short-wavelength-side intermediate color, the purity of blue reproduced by the blue component light B is improved.

In the first embodiment, the long-wavelength component light Gl includes the wavelength band of the long-wavelength-side intermediate color (particularly, orange). Meanwhile, in the color reproducibility priority mode, the long-wavelength component light Gl is cut off. Here, in the color reproducibility priority mode, green reproduced by the green component light G can be prevented from shifting to the blue side by cutting off the short-wavelength component light Gs in addition to the long-wavelength component light Gl.

[Second Embodiment]

Hereinbelow, a projection display apparatus according to a second embodiment will be described with reference to the drawings. It should be noted that differences between the above-mentioned first embodiment and the second embodiment will be main described Specifically, in the first embodiment, the polarization-state adjusting element 51X is an edge filter element. In contrast, in the second embodiment, the polarization-state adjusting element 51X is a notch filter element.

(Configuration of Polarization-State Adjusting Element)

Hereinbelow, a case where a notch filter element is used as the polarization-state adjusting element 51X according to the second embodiment will be described with reference to the drawing. FIG. 13 is a diagram showing a schematic configuration near the polarization-state adjusting element 51X according to the second embodiment.

As shown in FIG. 13, the notch-filter-type polarization-state adjusting element 51X is located between the condenser lens 83G and the light-incident-side polarizing plate 52G, and is provided by laminating two plates on an optical path of the green component light G (the central-wavelength component light Gc and the long/short-wavelength component light LS) separated by the dichroic mirror 72.

Specifically, the notch-filter-type polarization-state adjusting element 51X is formed of a light-incident-side polarization-state adjusting element 51X-A and a light-emitting-side polarization-state adjusting element 51X-B.

For example, the light-incident-side polarization-state adjusting element 51X-A does not adjust the central-wavelength component light Gc, but adjusts only the polarization state of the long-wavelength component light Gl having the wavelength band of the long-wavelength-side intermediate color (for example, yellow and or ). Meanwhile, the light-emitting-side polarization-state adding element 51X-B does not adjust the central-wavelength component light Gc, but adjusts only the polarization state of the short-wavelength component light Gs having the wavelength band of the short-wavelength-side intermediate color or example, a part of cyan (on the long-wavelength side)).
(Function of Polarization-State Adjusting Element)

Figure 14A:
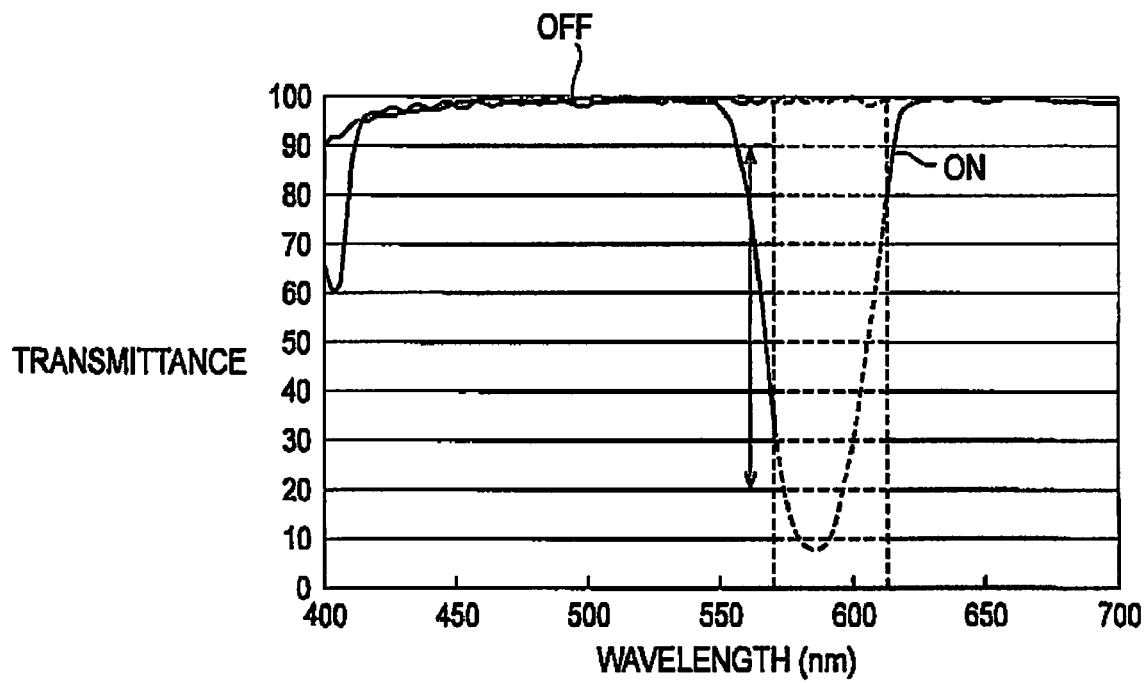
FIGS. 14A and 14B are diagrams each for explaining the function of a notch filter element according to the second embodiment.
Figure 14B:
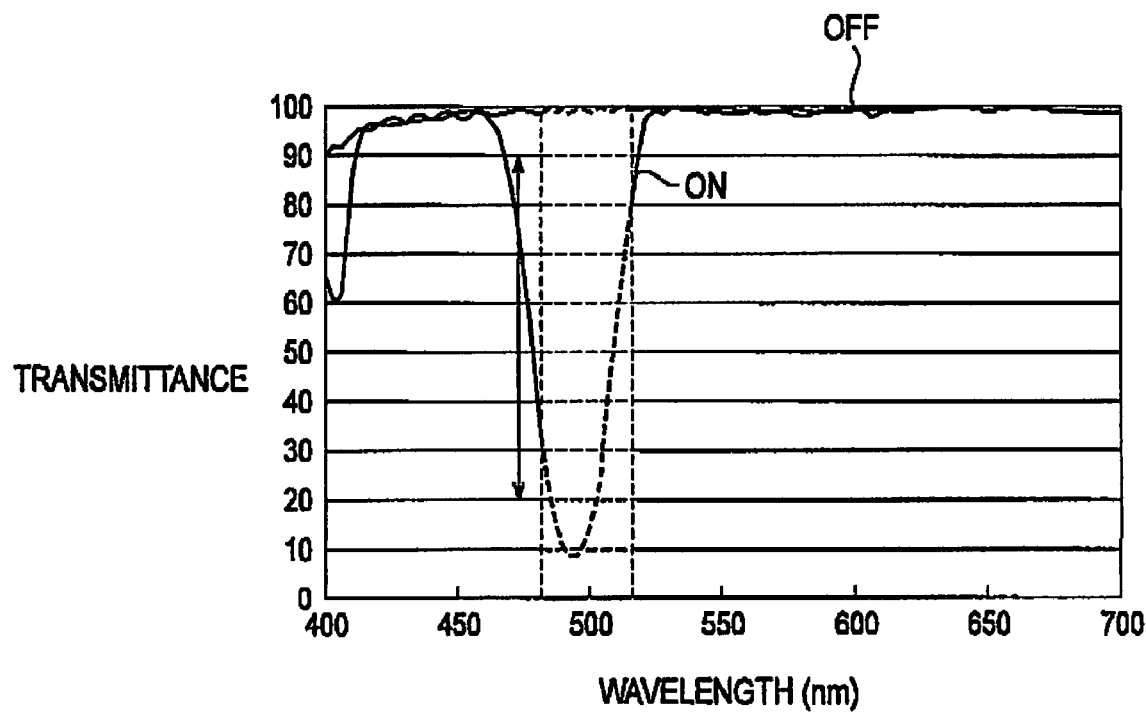

Hereinbelow, the functions of the light-incident-side polarization-state adjusting element 51X-A and light-emitting-side polarization-state adjusting element 51X-B according to the second embodiment will be described with reference to the drawings. FIGS. 14A and 14B are diagrams each for explaining the function of the notch filter element according to the second embodiment.

As shown in FIG. 14A, when no voltage is applied to the light-incident-side polarization-state adjusting element 51X-A (POWER OFF), the light-incident-side polarization-state adjusting element 51X-A transmits the green component light G without rotating the polarization direction of the long-wavelength component light Gl.

Meanwhile, when a voltage is applied to the light-incident-side polarization-state adjusting element 51X-A (POWER ON), the light-incident-side polarization-state adjusting element 51X-A transmits the green component light G while rotating only the polarization direction of the long-wavelength component light Gl.

As shown in FIG. 14B, when no voltage is applied to the light-emitting-side polarization-state adjusting element 51X-B (POWER OFF), the light-emitting-side polarization-state adjusting element 51X-B traits the green component light G without rotating the polarization direction of the short-wavelength component light Gs.

Meanwhile, when a voltage is applied to the light-emitting-side polarization-state adjusting element 51X-B (POWER ON), the light-emitting-side polarization-state adjusting element 51X-B transmits the green component light G while rotating only the polarization direction of the short-wavelength component light Gs.
(Advantages and Effects)

In the projection display apparatus 100 according to the second embodiment, the light-incident-side polarization-state adjusting element 51X-A and the light-emitting-side polarization-state adjusting element 51X-B are laminated when using the notch-filter-type polarization-state adjusting element 51X. Accordingly, the projection display apparatus 100 is capable of separately adjusting the polarization state of the central-wavelength component light Gc and each of the polarization states of the long-wavelength component light Gl and the short-wavelength component light Gs. Thus, the same effects as those in the first embodiment can be obtained.
[Third Embodiment]

Hereinbelow, a third embodiment will be described with reference to the drawing. In the third embodiment, the configuration of the above-mentioned liquid crystal panel 50 will be described in detail.
(Configuration of Light Valve)

Figure 15:
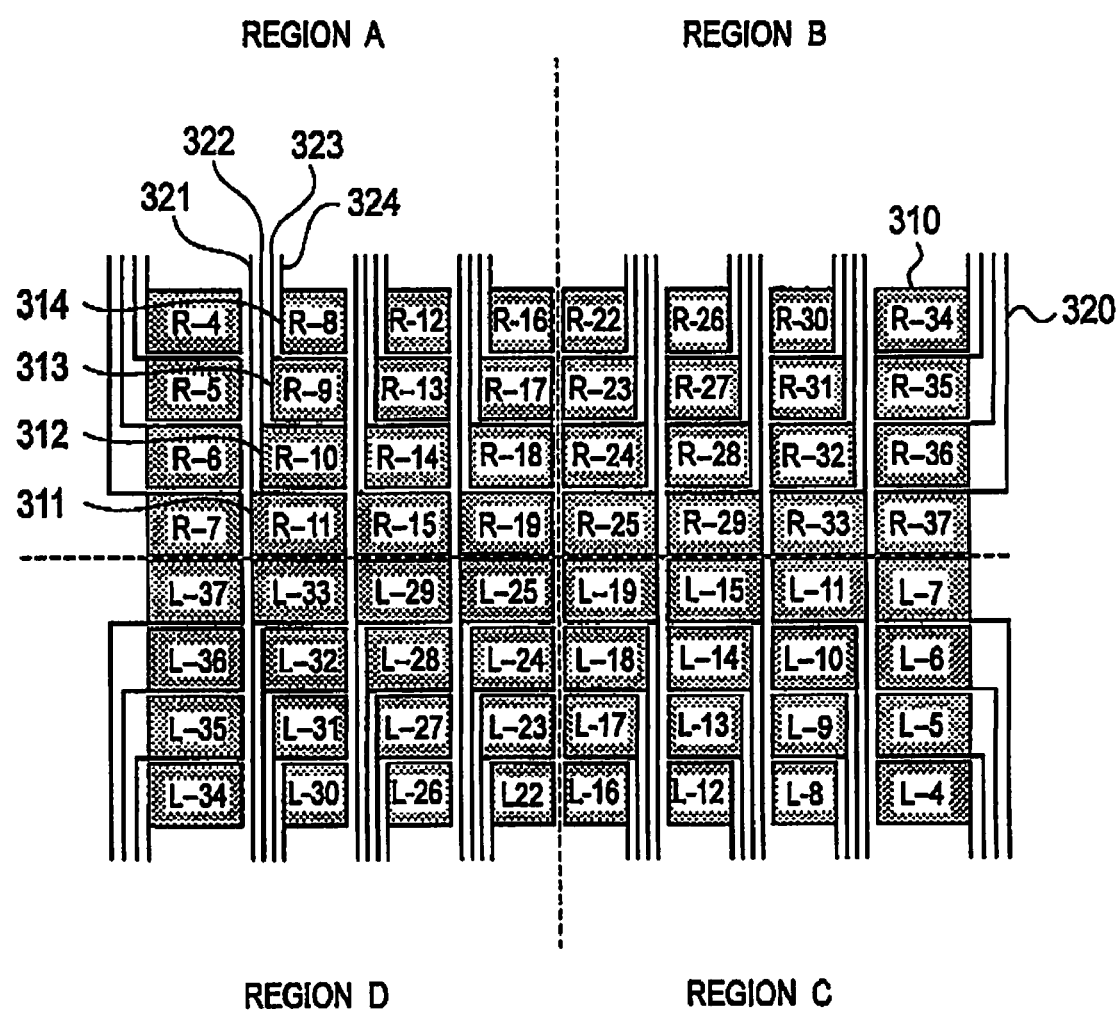
FIG. 15 is a diagram showing a configuration of a liquid crystal panel 50 (particularly, a polarization-state adjusting element 51X and the like) according to a third embodiment.

Hereinbelow, the configuration of a light valve in the third embodiment will be described with reference to the drawing. FIG. 15 is a diagram showing the configuration of the liquid crystal panel 50 (particularly, the polarization-state adjusting element 51X and the like) in the third embodiment. Note that, FIG. 15 is a diagram of the liquid crystal panel 50 viewed from a light-incident surface (or a light-emitting surface) side of the liquid crystal panel 50.

As shown in FIG. 15, the liquid crystal panel 50 includes multiple segments 310 and multiple transparent electrodes 320.

The segments 310 are arranged in a matrix, and can be taken as having four regions (regions A to D).

In the regions provided in the upper half of the liquid crystal panel 50 (the region A and the region B), the area of each segment 310 decreases as the position level of the segment 310 goes up. Meanwhile, in the regions provided in the lower half of the liquid crystal panel 50 (the region C and the region D), the area of each segment 310 decreases as the position level of the segment 310 goes down.

Meanwhile, in the regions provided in the left half of the liquid crystal panel 50 (the region A and the region D), the transparent electrode 320 is provided on the left side of each of the segments 310. In the regions provided in the right half of the liquid crystal panel 50 (the region B and the region C), the transparent electrode 820 is provided on the right side of each of the segments 310.

Here, the configuration of each segment 310 will be further described in detail by giving segments 311 to 314 as examples.

The area of the segment 312 provided on the upper side of the segment 311 is smaller than the area of the segment 311 by the width of a transparent electrode 321 connected to the segment 311.

The area of the segment 313 provided on the upper side of the segment 312 is further smaller than the area of the segment 312 by the width of a transparent electrode 322 connected to the segment 312. In other words, the area of the segment 313 is smaller than the area of the segment 311 by the widths of the transparent electrodes 321 and 322.

The area of the segment 314 provided on the upper side of the segment 313 is further smaller than the area of the segment 813 by the width of a transparent electrode 328 connected to the segment 313. In other words, the area of the segment 314 is smaller than the area of the segment 311 by the widths of the transparent electrodes 321 to 323.

Each of the transparent electrodes 320 is formed of a transparent member, and is connected to a corresponding one of the segments 310. In addition, the transparent electrodes 320 are provided in spaces formed by reduction of the areas of the segments 310.

In the regions provided in the upper half of the liquid crystal panel 50 (the region A and the region B), the transparent electrodes 820 are connected to a flexible printed circuit (FPC) (not illustrated) provided above the liquid crystal panel 50. In the regions provided in the lower half of the liquid crystal panel 50 (the region C and the region D), the transparent electrodes 320 are connected to an FPC (not illustrated) provided below the liquid crystal panel 50.

It should be noted that, in the third embodiment, an example is given of a case where the FPCs are provided above and below the liquid crystal panel 50; however, the present invention is not limited to this case. Specifically, the FPCs may be provided to the right and the left of the liquid crystal panel 50. In this case, it is of course sufficient that the configuration shown in FIG. 15 only needs to be turned by 90°.

(Advantages and Effects)

When it is unfavorable to route the transparent electrodes 320 in a thickness direction of the liquid crystal panel 50, that is, when it is unfavorable to route the transparent electrodes 320 in the light-incident surface (the light-emitting surface), the liquid crystal panel 50 according to the third embodiment is capable of efficiently reducing the spaces in which the transparent electrodes 320 are provided. In other words, the proportion of area where each segment 310 occupies in the liquid crystal panel 50 is increased, and thereby effects of modulation by each segment 310 can be sufficiently obtained.

Using the transparent electrodes 320 as electrodes connected respectively to the segments 310 sufficiently suppresses reduction in light use efficiency attributable to the electrodes.

Since the FPCs are provided above and below the liquid crystal panel 50, the length of each transparent electrode 320 can be reduced. For this reason, the electrical resistance of each transparent electrode 320 is reduced, and thereby the width of the transparent electrode 320 can be reduced.

[Other Embodiments]

Although the present invention has been described with the above-mentioned embodiments, it should be understood that the description and drawings constituting a part of this disclosure do not limit the present invention. Various alternative embodiments, examples, and operation techniques will be apparent from this disclosure to those skilled in the art.

Specifically, in the above-mentioned embodiments, a superimposing component light is the green component light G, and the long/short-wavelength component light LS is the long-wavelength component light Gl and short-wavelength component light Gs; however, the present invention is not limited to this configuration. For example, the superimposing component light may be the blue component light B, and in such a case, the fourth color component light may be the short-wavelength component light Gs or the like.

Although not specifically described in the first embodiment, when the polarization-state adjusting element 51X adjusts the polarization state of the long-wavelength component light Gl, an amount of modulation may of course be controlled in accordance with an input signal for red, an input signal for green, and an input signal for blue.

In this case, the polarization state of the long-wavelength component light Gl is adjusted in accordance with whether or not a voltage is applied to the polarization-state adjusting element 51X (POWER ON or POWER OFF). In other words, the polarization-state adjusting element 51X is an optical element that adjusts an amount of modulation of a long-wavelength component light Gl to be superimposed on the green component light G, which is to be applied to the liquid crystal panel 50G.

Specifically, the modulation amount controller 230 calculates a representative value of brightness on the basis of the input signal for red, the input signal for green, and the input signal for blue. The representative value of brightness is, for example, a minimum value of brightness, a maximum value of brightness, an average value of brightness, or the like. Subsequently, the modulation amount controller 230 determines an amount of superimposition of the long-wavelength component light Gl with respect to an image in accordance with the representative value of brightness, and thereby controls the amount of modulation of the polarization-state adding element 51X.

In the above-mentioned embodiments, the case where orange is used as the intermediate color between yellow and red has been described; however, the present invention is not limited to this case. It is a matter of course that the present invention only needs to have a wavelength band between yellow and red.

In the above-mentioned embodiments, each of the liquid crystal panels 50 (the liquid crystal panel 50R, the liquid crystal panel 50G, and the liquid crystal panel 50B) is provided with a compensator; however, the present invention is not limited to this configuration. The compensator is not necessarily provided.

Various alternative embodiments, examples, and operational techniques will become apparent from this disclosure to those skilled in the art. Thus, the technical scope of the present invention is only defined by the subject matters according to the scope of claims appropriate from the foregoing description.

What is claimed is:

1. An illumination apparatus comprising:
   a light source configured to emit white light;
   a color separator configured to separate the white light emitted by the light source into a first color component light having a first wavelength band, a second color component light having a second wavelength band, and a third color component light having a third wavelength band;
   a first light valve configured to modulate the first color component light on the basis of a first input signal;
   a second light valve configured to modulate the second color component light on the basis of a second input signal;
   a third light valve configured to modulate the third color component light on the basis of a third input signal;
   a color combiner configured to combine the first color component light emitted from the first light valve, the second color component light emitted from the second light valve, and the third color component light emitted from the third light valve; and
   a polarization-state adjusting element provided on the light-incident-side of the second light valve, wherein
   the second wavelength band has a central-wavelength band, a short-wavelength band on the shorter wavelength side than the central-wavelength band, and a long-wavelength band on the longer wavelength side than the central-wavelength band, and
   the polarization-state adjusting element is configured to separately adjust a polarization state of light in the central-wavelength band and a polarization state of light in each of the short-wavelength band and the long-wavelength band.

2. The illumination apparatus according to claim 1, wherein the long-wavelength band has a wavelength band wider than a wavelength band of the short-wavelength band.

3. The illumination apparatus according to claim 1, wherein
   the polarization-state adjusting element is an edge filter element configured not to adjust the polarization state of light in the central-wavelength band but to adjust the polarization state of light in each of the short-wavelength band and the long-wavelength band.

4. The illumination apparatus according to claim 1, wherein
the polarization-state adjusting element is formed of a combination of: a first notch filter element configured not to adjust the polarization state of light in the central-wavelength band but to adjust the polarization state of light in the short-wavelength band; and a second notch filter element configured not to adjust the polarization state of light in the central-wavelength band but to adjust the polarization state of light in the long-wavelength band.

5. The illumination apparatus according to claim 1, wherein the second wavelength band includes at least a green wavelength band.

6. A projection display apparatus comprising:
a light source configured to emit white light;
a color separator configured to separate the white light emitted by the light source into a first color component light having a first wavelength band, a second color component light having a second wavelength band, and a third color component light having a third wavelength band;
a first light valve figured to modulate the first color component light on the basis of a first input signal;
a second light valve configured to modulate the second color component light on the basis of a second input signal;
a third light valve configured to modulate the third color component light on the bas of a third input signal;
a color combiner configured to combine the first color component light emitted from the first light valve, the second color component light emitted from the second light valve, and the third color component light emitted from the third light valve;
projection means configured to project light emitted from the color combiner; and
a polarization-state adjusting element provided on the light-incident-side of the second light valve, wherein
the second wavelength band has a central-wavelength band, a short-wavelength band n the shorter wavelength side than the central-wavelength band, and a long-wavelength band on the longer wavelength side than the central-wavelength band, and
the polarization-state adjusting element is configured to separately adjust a polarization state of light in the central-wavelength band and a polarization state of light in each of the short-wavelength band and the long-wavelength band.

* * * * *